US012141621B2

(12) United States Patent
Vasireddy et al.

(10) Patent No.: US 12,141,621 B2
(45) Date of Patent: Nov. 12, 2024

(54) SYSTEM AND METHODS FOR GENERATING SECURE EPHEMERAL CLOUD-BASED COMPUTING RESOURCES FOR DATA OPERATIONS

(71) Applicant: PwC Product Sales LLC, New York, NY (US)

(72) Inventors: Praveen Vasireddy, Tampa, FL (US); Sriraj Kadimisetty, Tampa, FL (US); Michael Flynn, Tampa, FL (US); Michael Baccala, Tampa, FL (US); Divya Aligi Reddy, Tampa, FL (US); Avinash Pallapu, Tampa, FL (US)

(73) Assignee: PwC Product Sales LLC, New York, NY (US)

( * ) Notice: Subject to any disclaimer, the term of this patent is extended or adjusted under 35 U.S.C. 154(b) by 310 days.

(21) Appl. No.: 15/931,416

(22) Filed: May 13, 2020

(65) Prior Publication Data
US 2020/0364093 A1    Nov. 19, 2020

Related U.S. Application Data

(60) Provisional application No. 62/847,846, filed on May 14, 2019.

(51) Int. Cl.
*G06F 15/16* (2006.01)
*G06F 9/50* (2006.01)
*G06F 16/23* (2019.01)

(52) U.S. Cl.
CPC ........ *G06F 9/5077* (2013.01); *G06F 16/2379* (2019.01)

(58) Field of Classification Search
CPC .............................. G06F 9/5077; G06F 9/5061
See application file for complete search history.

(56) References Cited

U.S. PATENT DOCUMENTS 9,116,731 B2 * 8/2015 Tung ..................... G06F 9/5072
9,146,721 B1 * 9/2015 Nagaraja ............... G06F 9/5077
(Continued)

FOREIGN PATENT DOCUMENTS

GB    2564863 A    1/2019

OTHER PUBLICATIONS

International Search Report and Written Opinion mailed Aug. 7, 2020, directed to International Application No. PCT/US2020/032726; 21 pages.

(Continued)

*Primary Examiner* — Hieu T Hoang
(74) *Attorney, Agent, or Firm* — Morrison & Foerster LLP (57) ABSTRACT

Systems and methods for generating secure ephemeral cloud-based computing resources for data operations is provided. In one or more examples, a computing hub can receive a data set as well as one or more business process instructions from an external entity. In response to receiving the data set and business process instructions, the computing hub can create one or more containers within a persistent data storage computing resource and store the data set in the one or more containers. The computing hub can generate one or more cloud-based computing resources on one or more cloud-based computing resource platforms based on the received business processes. The computing hub can be configured to arbitrate access to the stored data set from the generated cloud-based computing resources and can be also configured to track lineage information of the data set as it is process by the one or more cloud-based computing resources.

23 Claims, 7 Drawing Sheets

(56) References Cited

U.S. PATENT DOCUMENTS

| | | | | |
|---|---|---|---|---|
| 9,276,816 | B1* | 3/2016 | Conte | H04L 41/12 |
| 10,412,022 | B1* | 9/2019 | Tang | H04L 41/0896 |
| 10,462,009 | B1* | 10/2019 | Shiramshetti | H04L 41/12 |
| 10,616,751 | B1* | 4/2020 | Kanellakis | H04W 8/005 |
| 10,817,392 | B1* | 10/2020 | McAuliffe | G06F 11/0727 |
| 10,915,524 | B1* | 2/2021 | Gupta | G06F 16/27 |
| 11,176,483 | B1* | 11/2021 | Sundararaman | G06F 16/2282 |
| 2003/0217071 | A1* | 11/2003 | Kobayashi | G06F 40/58 |
| | | | | 707/999.102 |
| 2007/0011281 | A1* | 1/2007 | Jhoney | G06Q 10/10 |
| | | | | 709/220 |
| 2008/0040417 | A1* | 2/2008 | Juncker | H04L 67/303 |
| | | | | 709/201 |
| 2009/0204694 | A1* | 8/2009 | Kaneko | G06F 9/5038 |
| | | | | 714/48 |
| 2011/0125815 | A1* | 5/2011 | Kuo | G06F 3/0644 |
| | | | | 707/823 |
| 2012/0290850 | A1* | 11/2012 | Brandt | G06F 21/575 |
| | | | | 713/189 |
| 2013/0152088 | A1* | 6/2013 | Gkantsidis | G06F 16/24 |
| | | | | 707/693 |
| 2013/0304765 | A1* | 11/2013 | Failelson | G06F 21/6236 |
| | | | | 707/785 |
| 2014/0244791 | A1* | 8/2014 | Fellows | H04L 67/1097 |
| | | | | 709/217 |
| 2014/0280810 | A1* | 9/2014 | Gabrielson | H04L 41/0806 |
| | | | | 709/222 |
| 2014/0289733 | A1* | 9/2014 | Fritz | G06F 9/5066 |
| | | | | 718/104 |
| 2015/0163206 | A1* | 6/2015 | McCarthy | H04L 63/104 |
| | | | | 726/4 |
| 2016/0182397 | A1* | 6/2016 | Mcfarlin | H04L 41/5051 |
| | | | | 709/226 |
| 2016/0246788 | A1* | 8/2016 | Thangaraj | G16H 80/00 |
| 2016/0342404 | A1* | 11/2016 | Fawcett | G06F 8/61 |
| 2017/0046230 | A1* | 2/2017 | Guzik | H04L 65/765 |
| 2017/0139746 | A1* | 5/2017 | Maier | G06F 16/907 |
| 2017/0286503 | A1* | 10/2017 | Koukoumidis | G06F 16/22 |
| 2017/0366606 | A1* | 12/2017 | Ben-Shaul | H04L 67/2876 |
| 2018/0004868 | A1* | 1/2018 | Adam | G06F 30/20 |
| 2018/0006977 | A1* | 1/2018 | Nandi | H04L 51/226 |
| 2018/0074724 | A1* | 3/2018 | Tremblay | G06F 3/0631 |
| 2018/0157542 | A1* | 6/2018 | Savov | H04L 67/131 |
| 2018/0203919 | A1* | 7/2018 | Mackay | G06F 16/2237 |
| 2018/0240032 | A1* | 8/2018 | van Rooyen | G06K 9/6297 |
| 2018/0299873 | A1* | 10/2018 | Chauvet | H04L 12/2856 |
| 2019/0166019 | A1* | 5/2019 | Jagadeesh | H04L 41/5054 |
| 2019/0273807 | A1* | 9/2019 | Mimran | H04L 67/1021 |
| 2019/0280865 | A1* | 9/2019 | Tobias | H04L 9/0825 |
| 2019/0362004 | A1* | 11/2019 | Oks | G06F 9/5005 |
| 2020/0028911 | A1* | 1/2020 | Sun | G06F 9/50 |
| 2020/0125568 | A1* | 4/2020 | Idicula | G06N 20/20 |
| 2020/0218579 | A1* | 7/2020 | D M | G06F 16/24578 |
| 2020/0220771 | A1* | 7/2020 | Shang | H04L 41/40 |
| 2020/0293684 | A1* | 9/2020 | Harris | H04W 12/02 |
| 2020/0351336 | A1* | 11/2020 | Campbell | H04L 67/1008 |
| 2022/0129363 | A1* | 4/2022 | Hildebrandt | G06N 3/08 |

OTHER PUBLICATIONS

Thamsen et al. "Ellis: Dynamically Scaling Distributed Dataflows to Meet Runtime Targets," 2017 IEEE International Conference on Cloud Computing Technology and Science (Cloudcom), Dec. 11, 2017; pp. 146-153.

* cited by examiner

SYSTEM AND METHODS FOR GENERATING SECURE EPHEMERAL CLOUD-BASED COMPUTING RESOURCES FOR DATA OPERATIONS

REFERENCE TO RELATED APPLICATIONS

This application claims the benefit of U.S. Provisional Patent Application No. 62/847,846, filed May 14, 2019, the entire contents of which are incorporated herein by reference.

FIELD OF THE DISCLOSURE

This disclosure relates to building, maintaining, and terminating cloud-based computing resources based on received data and business processes to be performed on the data.

BACKGROUND OF THE DISCLOSURE

The era of "big data", in which commercial and governmental enterprises seek to store and analyze large data sets, have presented many challenges in terms of processing the and managing such large data sets in a cost-effective and secure manner. "Persistent systems" in which physical and static hardware owned by a single user are built and maintained to handle the storage and analysis of large data sets can often be inefficient from a computing resource and cost perspective. For instance, the computing requirements to analyze large data sets can fluctuate depending on the needs of a particular enterprise. Thus, a persistent system has to be built keeping in mind the worst-case scenario (i.e., the maximum amount of computing resources that could possibly being needed to analyze data.) From a cost-perspective, maintaining a persistent system can be inefficient, because the cost required to build and maintain a persistent system that can deal with a worst-case scenario often requires enterprises to spend more on computing resources than is really required.

There can be additional challenges to managing big data system, in business environments in which multiple enterprises turn to a third-party to help manage and implement the analysis of large data sets. For instance, the cost of provisioning and maintaining big data systems by a third-party can be paramount. A client may be sensitive to costs and thus would require that a third party vendor offer them the most efficient and cost-effective solution. Additionally, since a third-party could potentially handle data from multiple private or governmental enterprises, it is important for a third-party vendor to store and operate on the data sets in a secure manner, ensuring not only that malicious external users do not have access to the data, but also ensuring that one client does not gain access to another client's data accidently or inadvertently by virtue of their access to their own data set stored by the third party vendor.

In light of the challenges described above, there can be a need for a system and method of building and maintaining computing resources to handle large data sets in a cost-effective and resource efficient manner. Such systems and methods may also be required to have additional security measures in place so as to secure the data, especially in instances where third-parties are asked to build and maintain such systems for multiple clients as described above.

SUMMARY OF THE DISCLOSURE

Accordingly, systems and method for building and maintaining ephemeral computing environments that can store and process large data sets and analyze them according to one or more pre-defined business processes is provided. In one or more examples, a computing system can be configured to ingest a data set and a set of business processes that describe operations to be performed on the data set from a client or other external user. The system can then implement and maintain a cloud-based computing system that can store and process the large data set and provision the computing resources required to perform the business processes received from the user.

In one or more examples, the system can determine one or more computing system requirements based on the received business process instructions and then can provision those computing resources on a cloud-based service provider. The system can be cloud service agnostic in that it can create and maintain multiple computing environments across multiple cloud service providers, and can decide which cloud-based service provider to utilize based on the client's requirements or other factors.

In one or more examples, and as discussed above, the system can provision cloud-based computing resources based on the business process instructions received from a client. In addition to provisioning the computing resources in a cloud based computing environment, in one or more additional examples, the system can also scale the storage and/or computing resources up or down based on the real-time needs of the client, and can also terminate computing resources when they are no longer required. Thus, in one or more examples, the system can create ephemeral computing environments for a client user thereby providing them with an efficient and cost-effective solution to implementing their data analytics needs.

DETAILED DESCRIPTION OF THE DISCLOSURE

The following description sets forth exemplary methods, parameters, and the like. It should be recognized, however, that such description is not intended as a limitation on the scope of the present disclosure but is instead provided as a description of exemplary embodiments.

In the following description of the disclosure and embodiments, reference is made to the accompanying drawings in which are shown, by way of illustration, specific embodiments that can be practiced. It is to be understood that other embodiments and examples can be practiced, and changes can be made, without departing from the scope of the disclosure.

In addition, it is also to be understood that the singular forms "a," "an," and "the" used in the following description are intended to include the plural forms as well unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices without loss of generality.

However, all of these and similar terms are to be associated with the appropriate physical quantities and are merely convenient labels applied to these quantities. Unless specifically stated otherwise as apparent from the following discussion, it is appreciated that, throughout the description, discussions utilizing terms such as "processing," "computing," "calculating," "determining," "displaying," or the like refer to the action and processes of a computer system, or similar electronic computing device, that manipulates and transforms data represented as physical (electronic) quantities within the computer system memories or registers or other such information storage, transmission, or display devices.

Certain aspects of the present invention include process steps and instructions described herein in the form of an algorithm. It should be noted that the process steps and instructions of the present invention could be embodied in software, firmware, or hardware, and, when embodied in software, they could be downloaded to reside on, and be operated from, different platforms used by a variety of operating systems.

As computing technology evolves, current physical hardware computing systems are able to store more data and are able to perform analysis on the data in a quick and efficient manner. With the ability to store larger and large data sets, the age of "big data" has arrived. "Big data" can refer to systems and methods for analyzing and extracting information from data sets that are too large or complex to be deal with by traditional data-processing applications. Computing systems that are often employed to handle large and complex data sets, often require dedicated computing resources to handle individual tasks that use the data sets to extract valuable information for enterprises seeking to make use of large data sets that have been collected.

Given the size and complexity of today's data sets, the computing resources that can be provisioned and maintained to handle the analysis of large and complex data sets can often be expensive and inefficient at meeting the fluctuating needs of big data analysis. Furthermore, in situations in which third parties are engaged to create multiple computing systems for a plurality of clients, the building and provisioning of dedicated and secure computing environments for each client while maintaining cost-effectiveness can be challenging.

Current methods of ingesting data and building computing resources to analyze and operate on the ingested data involve the creation and use of persistent computing resources. Often times, storage and computing resources are coupled together in such systems. Persistent computing systems can refer to the provisioning of physical computing hardware that can be built to handle the storage of data as well as the computing hardware that will be used to perform operations on the data. Such physical hardware can lack the flexibility needed to manage varying and fluctuating computing needs, since the only way to scale the system for demand can be to build and add additional physical hardware to handle increased loads.

Thus, when building persistent computing systems, often times a designer must build the system according to the maximum possible need of the system, even if such a scenario may only be realized for short instances of time. Thus, using persistent systems to create the computing resources often required to analyze large data sets can be inefficient insofar as the amount of computing resources utilized is far greater than the average need of the system.

Figure 1:
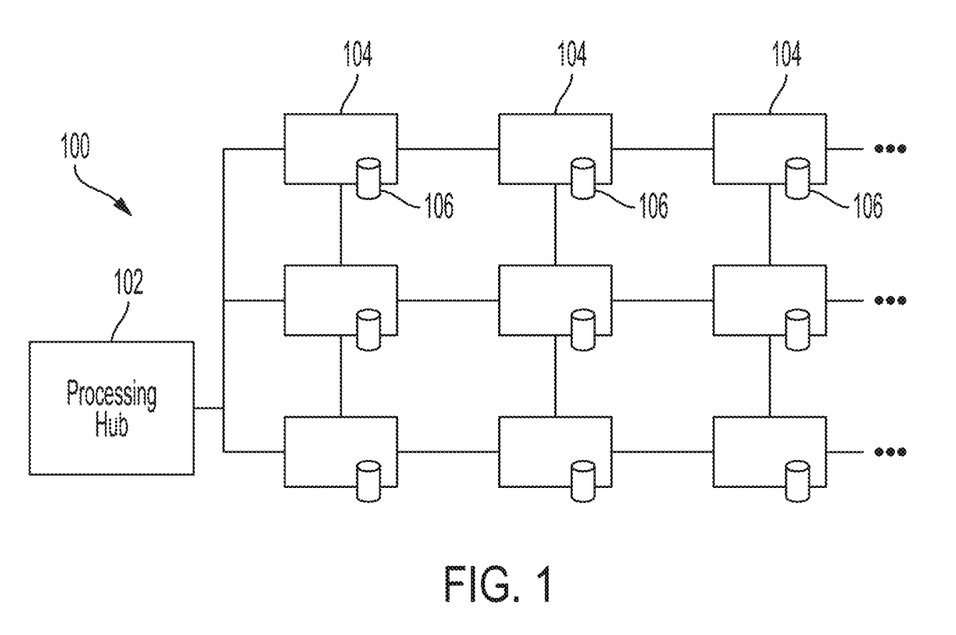
FIG. 1 illustrates an exemplary persistent computing system according to examples of the disclosure.

FIG. 1 illustrates an exemplary persistent computing system according to examples of the disclosure. The system 100 of FIG. 1 can represent some of the computing resources required to store large data sets, provide access to those data stored data sets, perform processing operations on the data sets, and storing the results of that processing for later use.

The system 100 in FIG. 1 can include a main computing hub 102 that includes one or more software-based applications that can serve as a hub for coordinating the computing resources required to store and process the large data sets. In one or more examples, the computing hub 102 can be connected via a computing network to one or more external entities. In one or more examples, the computing hub can be configured to receive data from the one or more external entities. As discussed above, the received data can be voluminous and complex, and the computing system 100 can be configured to store the large amount of data and perform analyses on the data using the computing resources of the system 100 as discussed below.

As described above, the computing hub 102 can serve as an interface between external entities that have data sets that they want to be processed, and the actual computing resources that can be used to process that data. As an example, the system 100 can include one or more computing nodes 104. In the example of FIG. 1, the system is depicted as having multiple computing nodes, but other exemplary systems can include one such node or thousands, or hundreds of thousands of computing nodes The number of computing nodes 104, as discussed in detail below, can be a function of the processing requirements of the system 100.

In one or more examples of the disclosure, each computing node 104 can also include a data storage resource 106 that is configured to store data that is to be analyzed and or processed. Additionally the data storage resource 106 can also be configured to store the results of the analysis/processing (i.e., the output) in addition to also storing the data to be analyzed/processed (i.e., the input). In the example of FIG. 1, the computing nodes and data storage are implemented together, meaning that each node can store its own data.

In one or more examples, the data storage resources 106 can also be configured to provide efficient access to the stored data, for instance by running database software that can index the data stored in it, thereby giving easy access to the computing hub or another computing resource to retrieve the specific data they are looking to access.

The computing nodes 104 can be configured to perform the processing and analysis on the data stored at data storage resource 106, as desired by the external entities that provide the data to be analyzed. Thus in one or more examples, the specific hardware used to implement the computing nodes and the number of such nodes can be dependent on the computing desires of the entity furnishing the data.

The computing nodes 104 can be configured to perform the processing and analysis on the data stored at data storage resources 106 of each node 104, as desired by the external entities that provide the data to be analyzed. Thus in one or more examples, the specific hardware used to implement the computing nodes and the number of such nodes can be dependent on the computing desires of the entity furnishing the data.

To illustrate the concepts above, an example application that could use a computing system 100 illustrated in FIG. 1 is provided. If an entity wished to implement a facial recognition system so that its employees could have access to various areas within the company, they could implement a system such as that depicted in FIG. 1. Each user of the facial recognition program, can have data associated with their user profile, the data can represent the unique markers of a face in binary form that can be used to determine if a particular face being analyzed matches a given profile.

The facial data can be ingested by the computing hub 102 and stored in the data storage resource 106 corresponding to the computing node or nodes that have been dedicated for the facial recognition processing. When processing data (i.e., performing facial recognition), the system 100 can access the facial profiles stored at each data storage resource 106 associated with a facial recognition computing node 104, and can use compute nodes 104 to perform the actual comparison between data captured by a camera and the user profiles stored by the computing system 100.

As the system 100 of FIG. 1 can be a "persistent" system, this can mean that each and every component within the system 100 can be implemented using physical hardware. An approach to building a computing system using physical hardware, can prove to be an inflexible approach. For instance, taking the facial recognition example provided above, when the system is initially provisioned, the resources can be provisioned based on the computing needs at the time of the system's inception. For instance, if a company has 5000 employees, the data storage resources 106 may be selected so that it has enough capacity to not only store the 5000 facial profiles, but to also perhaps store some additional profiles that may matriculate in the future.

Likewise, the number or type of compute nodes may be selected to accommodate the processing requirements engendered by having 5000 employees, and may even assume a worst-case scenario in which all 5000 employees are using the system at once.

However, should the number of employees significantly increase (or even decrease) or should the computing needs fluctuate, in a persistent computing system, adding or subtracting resources to the computing system to respond to changes in demand may not be practical and can even prove to be costly for an organization. This can lead to the inefficient utilization of computing resources, because an architect has to build to deal with the worst-case and short duration loads of the system, rather than optimizing the system for the average load it may handle.

Persistent computing systems can also be problematic in scenarios in which a third-party creates and maintains a computing resource system that services clients from multiple entities in one system. Using the facial recognition example above, if the computing system 100 is configured to receive and process data from multiple parties, then the system may need to be configured to ensure that it is able to store data separately for each party, and that it must be configured to ensure that one party cannot have access to another party's data.

Furthermore, in a shared system that services multiple clients, it may be difficult to charge clients for use of the services, since it may be difficult to assess which client is using the computing nodes, and which clients should be charged for inefficient use of those nodes. Due to the inflexibility of a persistent computing system as described above, clients may have to bear the cost of paying for nodes that are typically statically configured to support the maximum demand case as described above.

In order to mitigate the issues described above with respect to persistent computing systems, in one or more examples, the computing systems described above can be implemented using a system that can build and maintain ephemeral cloud based computing resources to handle various computing needs.

Ephemeral computing services can describe computing resources that can be created, scaled up or down, and terminated in real-time based on the current demands facing the system. In other words, ephemeral computing resources can only remain in existence during the time they are needed and can be terminated once they are no longer needed. In one or more examples, an ephemeral computing system can be built using a cloud-based computing resource architecture. A cloud-based service can refer to on-demand computing resources that can be provisioned and maintained without direct active management by a user. In one or more examples, cloud-based services (provided by various cloud service providers) can provide shared computing resources that are spread or distributed over multiple locations and servers.

Referring to FIG. 1, the storage resources 106, as well as the compute nodes 104 can be implemented using a cloud-based service provider. In an alternative embodiment the storage resources 106 can be kept as a persistent system, while the compute nodes 104 are implemented in an ephemeral cloud-based system.

Figure 2:
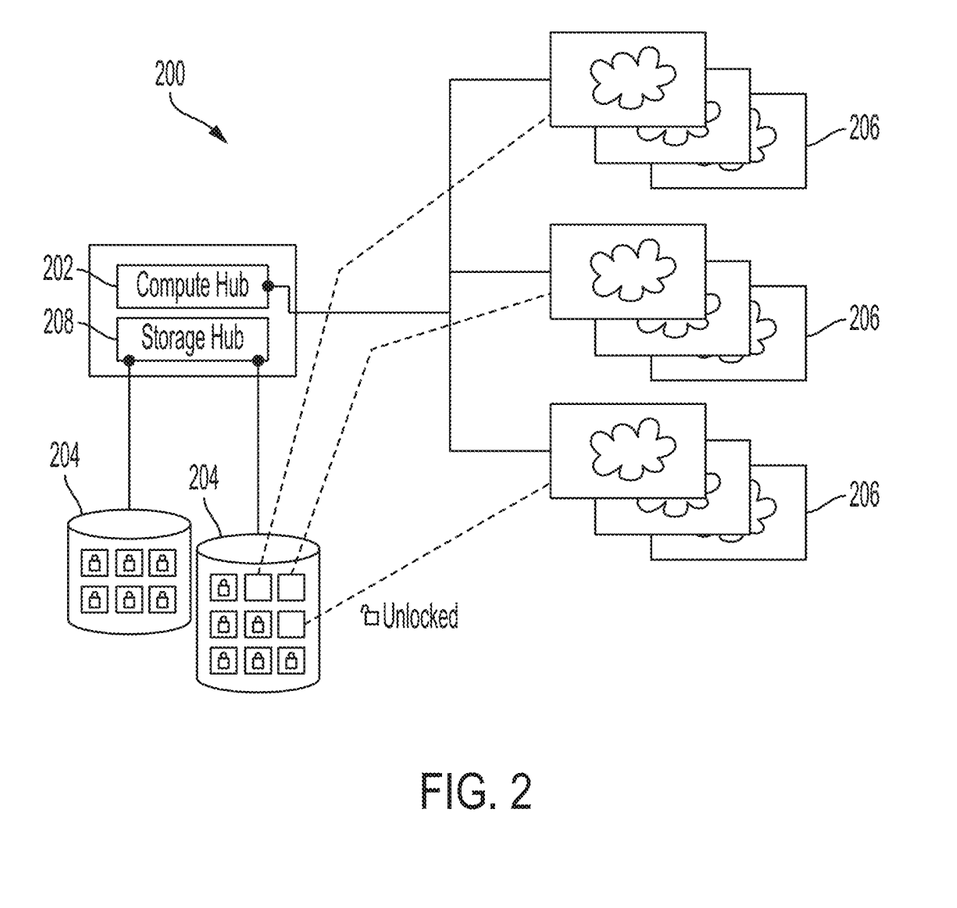
FIG. 2 illustrates an exemplary cloud-based ephemeral storage and computing environment according to examples of the disclosure.

FIG. 2 illustrates an exemplary cloud-based ephemeral storage and computing environment according to examples of the disclosure. Referring to FIG. 2, the system 200 can include a computing hub 202 that operates in substantially the similar way as described with hub 102 of FIG. 1. In one or more examples, the computing hub 202 can receive and ingest data from an external entity. An external entity can merely refer to another source computer that is seeking to transfer data to the system 200 so that the data can be stored, and the appropriate computing resources provisioned to handle the processing needs that the external entity expresses to the computing system 200. The method and format how an external entity expresses its processing needs to the computing system 200 is described below in detail.

In one or more examples, the computing hub 202 (i.e., a host) can be implemented itself using a cloud-based or virtual machine. The computing hub 202 can be configured to simplify the provisioning, management, and monitoring of on-demand computing nodes in virtual and cloud environments. The computing hub 202 can leverage cloud infrastructure to create host instances and can also be configured to provision and manage virtual or cloud-based computing nodes. In one or more examples, the computing hub 202 can be configured to use web-based user interfaces (UIs), command line interfaces (CLIs) as well as Representational State Transfer APIs (REST APIs) to convert processing instructions and computing needs into computing nodes capable of carrying out desired computing and data processing operations.

Once the data has been ingested by the computing system 200 at computing hub 202, the computing hub can store the data in one or more persistent data storage resources 204. Similar to the example of FIG. 1, persistent data storage resources 204 can be configured to store data provided to it by computing hub 202, and can also be configured to provide secure access to the data. In one or more additional examples, data storage resources 204 can also be configured to index the data in a manner that makes the data efficiently available to be called for processing by computing hub 202.

In one or more examples, the computing hub 202, in addition to receiving data from an external entity, can also receive one or more business processes from the external entity. A business process can refer to one or more specifications that define the types of data operations that are to be performed on the data. For instance, referring back to the facial recognition example described above, a business process can be transmitted to the computing hub 202 that states the types of processing and the parameters for processing the data stored in the data storage to implement a facial recognition application. Upon receiving the business process from the external entity, the computing hub 202 can use that information to created one or more cloud-based or virtual machine based computing nodes.

As briefly mentioned above, the computing system 200 can included one or more cloud based or virtual machine-based or Docker container based computing nodes 206. These computing nodes 206 can be provisioned and managed by computing hub 202. In one or more examples, computing hub 202 can create the computing nodes 206 using various public cloud infrastructure platforms such as Amazon Web Services (AWS), Microsoft Azure, and Google Cloud Platform (GCP.) In one or more examples the computing hub 202 can be "cloud agnostic" in that it does not mandate a preference for one cloud infrastructure platform or another. Instead, the computing hub 202 can take various factors into account when choosing which cloud service provider to implement a particular computing node on.

In one or more examples, one of the factors that computing hub 202 can take into account when choosing which cloud service provider to implement a particular computing node on can be user preference. For instance a particular client might have a preference of using a particular cloud service provider to implement their computing resources on. In such an instance, the computing hub 202 can simply ensure that the computing resources built for that particular client are all built on a particular cloud service provider platform.

In additional examples, the computing hub 202 can choose which cloud service provider to utilize for a particular computing node by analyzing the parameters associated with the one or more business processes that define what type of processing is to be implemented. For instance, if a particular type of processing is more efficiently handled using the computing resources of a particular cloud service provider, then the computing hub 202 (and specifically one or more programs/applications running in computing hub 202) can select that particular cloud service provider to implement the computing node 206. In this way, the computing hub 202 can remain cloud agnostic, and can implement computing nodes 206 across multiple cloud platforms.

As briefly described above each of the computing nodes 206 created by the computing system 200 can be ephemeral, meaning that they can be created and terminated based on the real-time needs of the business processes being implemented. Thus, in one or more examples, if a business process has concluded or has gone dormant, the computing system 202 can be configured to recognize this situation, and can be configured to terminate the business process based on the real-time need.

In the example, where a particular business process' real-time need has gone dormant, the computing system 200 can terminate the computing node that is implemented on a particular cloud service provider, but can also reinstate the computing node should the real-time need of the client engagement require it. In one or more examples, in addition to storing data, the computing system can also store schema information for each computing node it creates in response to a business process and one or more client preferences, and can use the stored schema information to reinstate the computing node should the need arise.

Separating data from computing resources can also lend itself to providing a computing system 200 with additional flexibility in terms of scaling up or down a particular computing node. In a standard enterprise Big data setup that uses persistent computing resources (such as those described above with respect to FIG. 1), the environment can be static with 500+ computing nodes running to accommodate various business computing needs. However, no system can be implemented as "one size fits all." The data for each user can be of different sizes, and the jobs/models/applications may have different needs and specifications. Additionally, various clients may have varying changing workloads over a particular engagement.

Thus in one or more examples, the computing system 200 can create ephemeral computing nodes as described above. In one or more examples, an ephemeral computing cluster can be initialized as a minimal configuration for each project and can be scaled up (i.e., have more computing resourced dedicated to the computing node) or scaled down (i.e., have less computing nodes dedicated to the computing node) based on the usage and real-time demand of a particular client. In one or more cases a computing node 206 of the computing system 200 can be deleted when not in use for some period of time (i.e., during holidays or other quiet periods.) When the period of inactivity ceases, the computing system 200 can be configured to recreate the computing node 206 as described above.

In one or more examples, by having the computing system 200 configured to auto scale the number of nodes (i.e., virtual machines) based on real demand, and auto downscale to the minimum nodes during periods of low activity, a client using such a system can save on the cost of paying for computing nodes that are typically statically configured to support the maximum demand. This feature can thus avoid paying for expensive computing nodes that are not in use.

As described above, the system 200 can be used to take in as inputs data and business processes from a user or client, and then be used to generate one or more computing resources based on those inputs. Also as described above, the system 200 can take in data and business processes from multiple users/clients and thus must ensure that the data is secure from unauthorized access (i.e., one client inadvertently or maliciously accessing another client's data). Also as described above, the business processes must ultimately be converted into computing resources.

In one or more examples of the disclosure, the system 200 can include a storage hub 208 that can be configured to arbitrate access between various ephemeral cloud-based computing resources 206 and the data store in the data storage resource 204. The storage hub can be configured to ensure that each computing node 206 is only granted access to the data for which the clients/engagements to which it is authorized.

Figure 3:
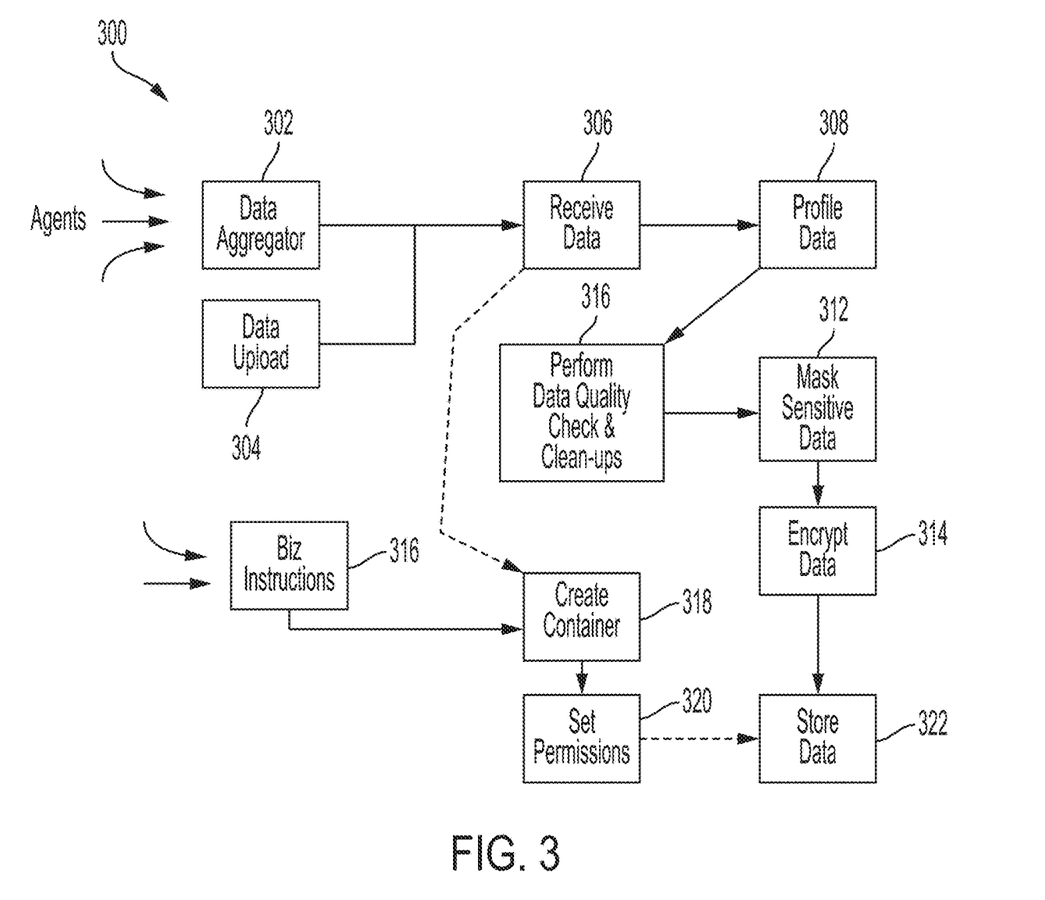
FIG. 3 illustrates an exemplary process for ingesting data and business processes from a client user according to examples of the disclosure.

FIG. 3 illustrates an exemplary process for ingesting data and business processes from a client user according to examples of the disclosure. In the example of FIG. 3, process 300 can be utilized to on-board (i.e., ingest data) and business processes provided to it from external users/clients. Thus, the process of 300 of FIG. 3 can illustrate the process of converting external data into data that is stored internally by computing system 200.

The process of ingesting data, and receiving business processing instructions can, in one or more examples, start out as parallel processes that eventually merge together with respect to storing the data ingested in a specific container. Thus, the process 300 can begin at step 302, wherein data from multiple sources belonging to a client can be aggregated into a single set of data.

In one or more examples, if the data can come from a single source in which case there may not be a need to aggregate the data. In such a scenario, the process can begin at step 304, wherein the data is directly uploaded to the computing hub 202. In any instance, whether the data is aggregated at step 302, or whether it is directly uploaded at step 304, the process can move to step 306 wherein computing hub 202 receives the data from the client.

Once the data has been received at step 306, the process can move to step 308, wherein the data is profiled. Profiling of data can refer to the process of identifying the source of the data. For instance in one or more examples, at step 308, the data can be inspected to determine the client to which the data belongs to, as well as the specific engagement pertaining to the client, for which the data belongs to.

Once the data has been profiled at step 308, the process can move to step 310 the computing hub performs an initial clean-up and quality check of the data. The cleaning up and quality check of data can refer the process of detecting and correcting (and in some instances removing) inaccurate, duplicated, or corrupt data from the data received from an external entity. In one or more examples, correcting or cleaning up data can also include cross checking the received data against a set of validated data and validating or correcting data values against the validated data.

Once computing hub 202 has performed the initial data quality checks and clean-ups at step 310, the process can move to step 312, wherein data that is marked as sensitive can be masked. Masking can refer to the process of hiding or obfuscating original data with modified content so that in the event that a malicious user gains access to the data, the data will not be useful to the malicious user. In one or more examples, masking can be performed using various known methods including: substitution, shuffling, number and date and variance, encryption, nulling, masking out, etc. Once sensitive data has been masked, the process can them move to step 314 wherein the masked data, as well as the non-masked data can be encrypted.

In parallel to the process described above, the computing hub 202 can also receive one or more business process instructions from an external entity. As described above, the business process instructions can reveal or describe the type of processing that the data received at step 316 is to undergo. Based on the received processing instructions received at step 316, the computing hub 202 can create partitions within the data storage resources 204. Thus, once the business processes have been received at step 316, the process can move to step 318 wherein containers are created based on the received business processes. A container can refer to a specific partitioned area within a data storage resource that is dedicated to storing the data associated with a specific client engagement. Thus, in the example of FIG. 3, the business process instructions received at step 316 can be associated with one or more client engagements. Based on the engagements found to be associated with the business instructions received a step 316, the computing hub 202 and/or the storage hub 208 can be utilized to create one or more containers at step 318, with each container associated with a specific client engagement.

Once the one or more containers associated with business process instructions have been created at step 318, the process 300 can move to step 320, wherein permissions are created for each container. The permissions created at step 320 can specify which entities are allowed access to the data. This feature thus can allow for secure access to the data by preventing non-authorized users or entities from accessing the data. In one or more examples, the storage containers can be secured from unauthorized access by implementing a token system that is described in detail below.

Once the containers have been created and appropriately permissioned at steps 318 and 320, the data encrypted at step 314 can be stored at step 322 in the containers created based on the business processing instructions received at step 316.

Figure 4:
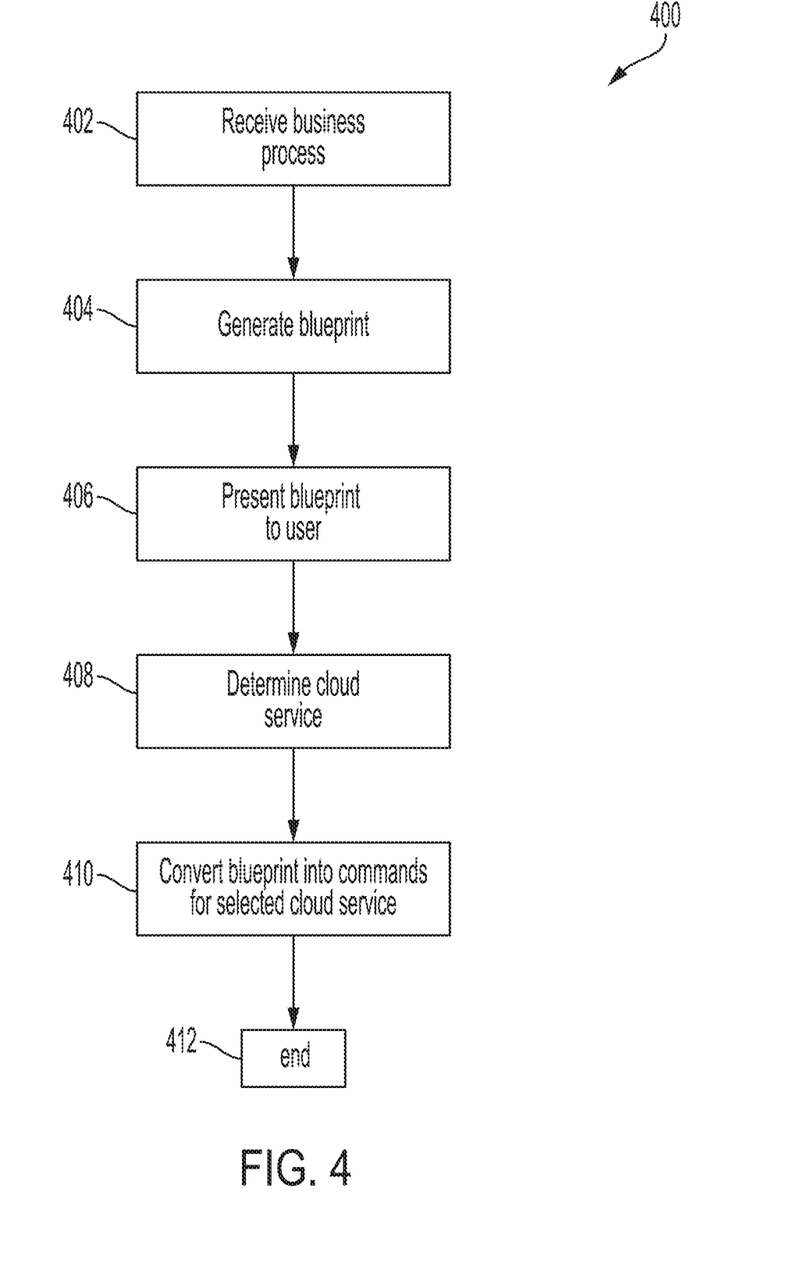
FIG. 4 illustrates an exemplary process for converting business processes received from a client user to one or more cloud-based computing resources according to examples of the disclosure/

As discussed above, at step 316, the computing hub can receive and store various business processes transmitted by an external entity or client. Also as previously discussed, the computing system 200 can be configured to convert the received business processes into one or more cloud-based computing nodes 206. FIG. 4 illustrates an exemplary process for converting business processes received from a client user to one or more cloud-based computing resources according to examples of the disclosure.

In the example of FIG. 4, the process 400 can begin at step 402 wherein one or more business processes are received from an external entity or client. Step 402 of process 400 can correspond to step 304 of FIG. 3 as described above. Once the business process has been received at step 402, the process can move to step 404 wherein one or more blueprints are generated based on the received business processes. In one or more examples, a blueprint in the context of the systems and methods of the disclosure, can refer to a specification of a computing cluster.

At step 404, the computing hub 202 can select one or more blueprints (i.e., pre-formed specifications of computing nodes) based on various factors found in the business processes. In one or more examples, the computing node blueprints can be selected based on various factors associated with a business process such as complexity, amount of computing resources required, fluctuation in computing resources (i.e., how much will the node have to scale up or down,) and other factors. As discussed above, at step 406, the computing hub 202 can select multiple blueprints and as discussed below, allow the user of the system to choose the blueprint they desire.

Once the blueprints to implement a business process have been selected, the process can move to step 406 wherein the selected blue prints are presented to the user of the computing system 200. In one or more examples at step 406, the user can select a blueprint that they wish to see be utilized to implement a cloud based computing node. In or more examples, in addition to selecting a blueprint to implement a computing node, the user may also specify one or parameters that can be further used by the system to configure the node using the selected blueprint. As discussed above, the user may select the blueprint and/or provide parameters via a GUI or other user interface.

Once the blueprint has been presented to the user and selected at step 406, the process 400 can move to step 408 wherein the cloud service provider at which the computing node is to be implemented can be chosen. As discussed above, the computing system 200 can be cloud service agnostic in that it can create and maintain multiple computing environments across multiple cloud service providers, and can decide which cloud-based service provider to utilize based on the client's requirements or other factors. Thus at step 408, the computing hub 202 can choose which cloud service provider to utilize based on the blueprint selected by a user of the system as well as the parameters for the computing node specified by the user.

In one or more examples, once the cloud service has been determined at step 408, the process can move to step 410 wherein the blueprint is converted in one or more commands that can be transmitted to the cloud service provider for implementation of the computing node. In one or more examples, each individual cloud computing platform/provider may have a unique or distinct syntax for specifying computing infrastructure to be built on the platform. Thus, in one or more examples, at step 410, the computing hub 202 can convert the blueprint into one or more commands in a syntax that corresponds to the cloud service provider selected at step 408. Once the blueprint has been converted into commands for a cloud based computing platform, the process can then move to step 412 wherein the process is terminated.

In addition to creating ephemeral cloud-based computing resources based on business processes, a user of the system 200 depicted in FIG. 2 and described may additionally want to have the ability to track what transactions the data that they stored in the computing system 200 underwent over its lifetime in the system. This type of history can be referred to as the "lineage" of the data. By tracking the lineage of a data set, a user of the computing system can quickly ascertain what processes and analyses the data they have transmitted to the system underwent over its lifetime. Providing reverse traceability as to how (what steps, what processes) and who (what user or system) were involved in getting a certain dataset to its current state can explain the different processes involved in the data flow and their dependencies.

In order for computing system 200 of FIG. 2 to track lineage information, in one or more examples, the system can be configured to capture enterprise dataflow as metadata, and the computing system can be configured to manage the metadata associated with lineage information so that a user can access it in an efficient manner. Furthermore, the computing system 200 can be configured to use the metadata captured as part of the lineage information so as to generate a visual report that can show the user how the data in the their data set has been processed over its lifetime.

Figure 5:
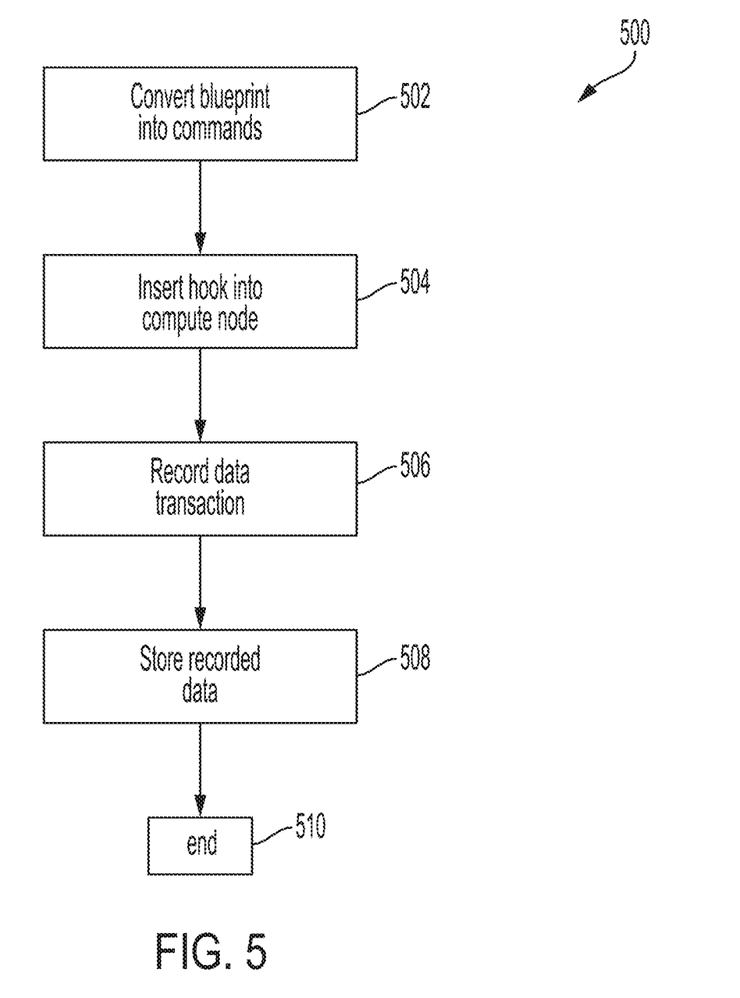
FIG. 5 illustrates an exemplary process for tracking the versions and lineage of data stored and processed in an ephemeral computing environment according to examples of the disclosure.

FIG. 5 illustrates an exemplary process for tracking the versions and lineage of data stored and processed in an ephemeral computing environment according to examples of the disclosure. In the example of FIG. 5, the process 500 can begin at step 502, wherein a blueprint (discussed above) can be converted into commands for a cloud service provider to generate a computing node. In one or more examples, step 502 can correspond to step 410 of FIG. 4 and thus the details regarding step 502 can be found above with respect to the discussion of step 410 of FIG. 4.

Once the blueprints have been converted into cloud service provider commands at step 502, the process can move to step 504 wherein one or more hook functions can be created (through the use of the same commands that are used to generate the computing node.) In other words, in addition to creating the computing node, the computing system 200 can attach one or more hooks to each computing node, and each hook can be configured to record lineage data about the types of processing that is being done at each computing node and the source of the data upon which the processing is occurring.

In one or more examples, the hooks that are attached to each computing node can record metadata about each transaction taking place on the data that the computing node is processing, and transmit that information to a metadata repository located within the computing system 202. In one or more examples, the metadata repository can be stored within the container stored within data storage resource 204 of the entity to which the computing node belongs. In one or more examples, the hooks can record the identity of the data acting as an input to the computing node, the type or character of the processing/analysis being stored in the data and then store the lineage information in the appropriate metadata repository.

In one or more examples, the lineage information can be stored in the form of a spreadsheet or csv file, with each row in the spreadsheet corresponding to a different transaction being performed on the data. Thus one row of the spreadsheet can correspond to a transaction, and can include such info as the identity of the input data, the type and character of the transaction being performed on the data, and the identity of the output data and where it was stored.

Once the hooks have been created at step 504, the process can move to step 506 wherein the hooks are used to record the data transactions as described above. As discussed above, the data can be recorded in spreadsheet form or using a csv file. Once the data has been recorded at step 506, the process can then move to step 508 wherein the recorded data is stored in a metadata repository as described above. Finally, once all the transactions have been recorded, the process 500 can move to step 510 wherein the process is terminated.

In one or more additional examples, the metadata collected by the hooks described above with respect to FIG. 5 can be used to generate a visualization at the request of the user. In one or more examples, a user of the computing system 200 can request a visualization of the entire lineage (or a partial lineage) of a particular set of data, and the computing system 200 can use the lineage data recorded by the hooks and stored in the metadata repository to generate a visualization that can inform the user as to the various transactions that the data went through.

Figure 6:
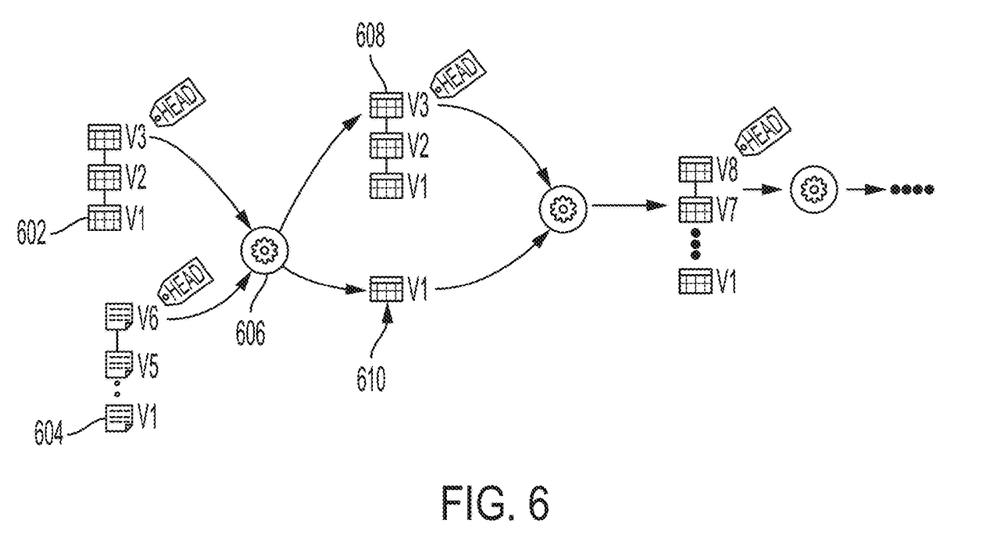
FIG. 6 illustrates an exemplary data lineage visualization according to examples of the disclosure.

FIG. 6 illustrates an exemplary data lineage visualization according to examples of the disclosure. In the example of FIG. 6, the graphic 600 can visualize one or more inputs to a process (i.e., inputs 602 and 604), one or more processes performed on the input (i.e., process 606), and can illustrate one or more outputs of a process (i.e., outputs 608 and 610.) The graphic 600 of FIG. 6 can thus provide an illustration of the lineage of the data in a manner that can be readily understood by a user of the computing system 200. In one or more examples, the visualization 600 can also include version information, showing various versions of a data input or output as shown in FIG. 6.

As outlined in the disclosure above, the systems and methods described above can provide a robust platform by which a user can provide their data and business processes to a computing system that can turn those inputs into a cloud-based computing architecture to effect those business processes. As described above, the computing platform can be configured such that it is cloud vendor agnostic. Each computing node can be provisioned, and the system can monitor each node for usage so as to scale up or scale down each computing node based on real-time demand of the system. By providing the ability to scale up or scale down or even terminate various computing nodes over the life of an engagement, the system can provide on-going cost reduction to its clients by allowing them to only utilize the computing resources they need.

Additionally, the system can provide an efficient method of allocating costs between various users of the system, by having each computing node reserved for the computing needs of each client/user of the system. Finally, the system can also produce data lineage information that can be stored and then accessed by a user to create visualizations of the types and character of transactions that have been performed on the data set over the course of an engagement.

Figure 7:
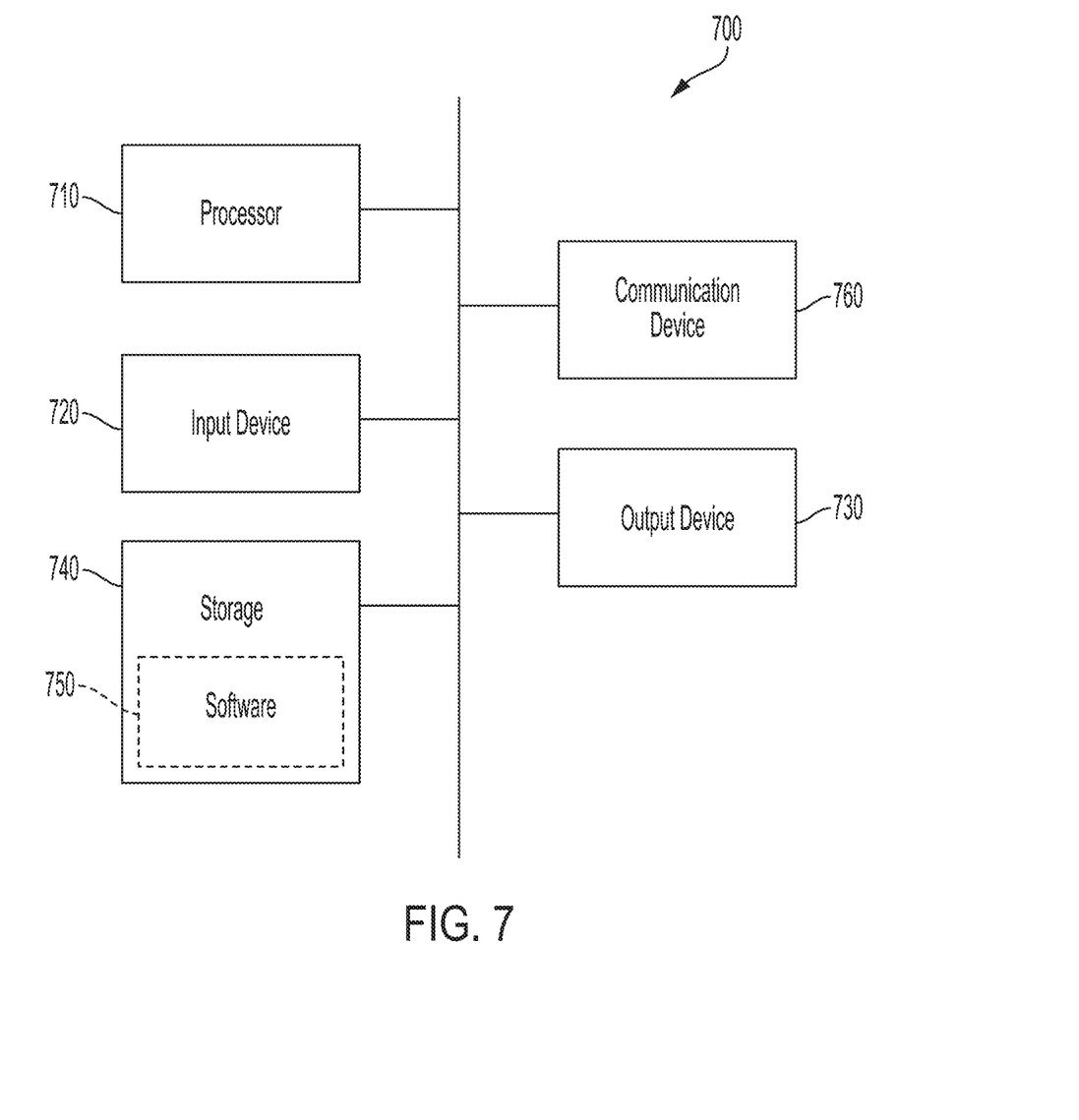
FIG. 7 illustrates an example of a computing device in accordance with one embodiment of the disclosure.

FIG. 7 illustrates an example of a computing device in accordance with one embodiment. Device 700 can be a host computer connected to a network. Device 700 can be a client computer or a server. As shown in FIG. 7, device 700 can be any suitable type of microprocessor-based device, such as a personal computer, work station, server, or handheld computing device (portable electronic device) such as a phone or tablet. The device can include, for example, one or more of processor 710, input device 720, output device 730, storage 740, and communication device 760. Input device 720 and output device 730 can generally correspond to those described above and can either be connectable or integrated with the computer.

Input device 720 can be any suitable device that provides input, such as a touchscreen, keyboard or keypad, mouse, or voice-recognition device. Output device 730 can be any suitable device that provides output, such as a touchscreen, haptics device, or speaker.

Storage 740 can be any suitable device that provides storage, such as an electrical, magnetic, or optical memory including a RAM, cache, hard drive, or removable storage disk. Communication device 760 can include any suitable device capable of transmitting and receiving signals over a network, such as a network interface chip or device. The components of the computer can be connected in any suitable manner, such as via a physical bus, or wirelessly.

Software 750, which can be stored in storage 740 and executed by processor 710, can include, for example, the programming that embodies the functionality of the present disclosure (e.g., as embodied in the devices described above).

Software 750 can also be stored and/or transported within any non-transitory, computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 740, that can contain or store programming for use by or in connection with an instruction-execution system, apparatus, or device.

Software 750 can also be propagated within any transport medium for use by or in connection with an instruction-execution system, apparatus, or device, such as those described above, that can fetch instructions associated with the software from the instruction-execution system, apparatus, or device and execute the instructions. In the context of this disclosure, a transport medium can be any medium that can communicate, propagate, or transport programming for use by or in connection with an instruction-execution system, apparatus, or device. The transport readable medium can include, but is not limited to, an electronic, magnetic, optical, electromagnetic, or infrared wired or wireless propagation medium.

Device 700 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 700 can implement any operating system suitable for operating on the network. Software 750 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

Therefore, according to the above, some examples of the disclosure are directed to a method for generating and maintaining computing resources comprising, receiving a data set, receiving one or more processing instructions corresponding to the received data set and comprising one or more processing tasks to be performed on the received data set, generating one or more data containers within a first computing resource based on the received one or more processing instructions, storing the data set in the one or more containers within the first computing resource, generating a second computing resource on one or more cloud-based computing platforms based on the received one or more processing instructions, determining a usage of the second computing resource, and modifying the second computing resource based on its determined usage. Additionally or alternatively to one or more examples disclosed above, generating the second computing resource on one or more cloud-based computing platforms based on the received one or more processing instructions includes selecting one or more blueprints from a set of pre-determined blueprints, wherein the selecting of the one or more blueprints is based on the received one or more processing instructions. Additionally or alternatively to one or more examples disclosed above, each blueprint of the set of pre-determined blueprints includes one or more parameters. Additionally or alternatively to one or more examples disclosed above, generating the second computing resource on the one or more cloud-based computing platforms includes presenting a user with the selected blueprints and receiving input from a user corresponding to a parameter of the one or more parameters. Additionally or alternatively to one or more examples disclosed above, generating the second computing resource on one or more cloud-based computing platforms based on the received one or more processing instructions includes selecting a cloud-based computing resource platform of the one or more cloud-based computing platforms based on the one or more parameters of the one or more selected blueprints. Additionally or alternatively to one or more examples disclosed above, generating the second computing resource on the one or more cloud-based computing platforms includes generating and transmitting one or more commands to the selected cloud-based computing resource platform to generate the one or more cloud-based computing resources. Additionally or alternatively to one or more examples disclosed above, modifying the second computing resource based on its determined usage includes upscaling the second computing resource if the determined usage is greater than a pre-determined value. Additionally or alternatively to one or more examples disclosed above, modifying the second computing resource based on its determined usage includes downscaling the second computing resource if the determined usage is less than a pre-determined value. Additionally or alternatively to one or more examples disclosed above, modifying the second computing resource based on its determined usage includes terminating the second computing resource if the determined usage is less than a pre-determined value. Additionally or alternatively to one or more examples disclosed above, the method further comprises generating a data profile for the received data set, wherein the data profile includes determining the identity of a client corresponding to the received data set. Additionally or alternatively to one or more examples disclosed above, the method further comprises performing a quality check of the received data set. Additionally or alternatively to one or more examples disclosed above, the method further comprises processing the received data set to remove duplicated data contained within the data set. Additionally or alternatively to one or more examples disclosed above, the received data set includes data identified as being sensitive, and wherein the method further includes masking data within the data set that is identified as being sensitive. Additionally or alternatively to one or more examples disclosed above, the method further comprises tracking the lineage of the data set. Additionally or alternatively to one or more examples disclosed above, tracking the lineage of the data set includes inserting one or more hooks to the second computing resource, and recording one or more transactions performed on the data set by the second computing resource using the one or more hooks. Additionally or alternatively to one or more examples disclosed above, the method further comprises storing the recoded one or more transactions performed on the data set in a memory. Additionally or alternatively to one or more examples disclosed above, the first computing resource is a physical storage device that is maintained by a single user.

Other examples of the disclosure are directed to a system for generating and maintaining computing resources comprising, one or more processors, a memory, and a first computing resource, wherein the one or more processors are configured to execute instructions stored on the memory that cause the system to, receive a data set, receive one or more processing instructions corresponding to the received data set and comprising one or more processing tasks to be performed on the received data set, generate one or more data containers within a first computing resource based on the received one or more processing instructions, store the data set in the one or more containers within the first computing resource, generate a second computing resource on one or more cloud-based computing platforms based on the received one or more processing instructions, determine a usage of the second computing resource, and modify the second computing resource based on its determined usage. Additionally or alternatively to one or more examples disclosed above, generating the second computing resource on one or more cloud-based computing platforms based on the received one or more processing instructions includes selecting one or more blueprints from a set of pre-determined blueprints, wherein the selecting of the one or more blueprints is based on the received one or more processing instructions. Additionally or alternatively to one or more examples disclosed above, each blueprint of the set of pre-determined blueprints includes one or more parameters. Additionally or alternatively to one or more examples disclosed above, generating the second computing resource on the one or more cloud-based computing platforms includes presenting a user with the selected blueprints and receiving input from a user corresponding to a parameter of the one or more parameters. Additionally or alternatively to one or more examples disclosed above, generating the second computing resource on one or more cloud-based computing platforms based on the received one or more processing instructions includes selecting a cloud-based computing resource platform of the one or more cloud-based computing platforms based on the one or more parameters of the one or more selected blueprints. Additionally or alternatively to one or more examples disclosed above, generating the second computing resource on the one or more cloud-based computing platforms includes generating and transmitting one or more commands to the selected cloud-based computing resource platform to generate the one or more cloud-based computing resources. Additionally or alternatively to one or more examples disclosed above, modifying the second computing resource based on its determined usage includes upscaling the second computing resource if the determined usage is greater than a pre-determined value. Additionally or alternatively to one or more examples disclosed above, modifying the second computing resource based on its determined usage includes downscaling the second computing resource if the determined usage is less than a pre-determined value. Additionally or alternatively to one or more examples disclosed above, modifying the second computing resource based on its determined usage includes terminating the second computing resource if the determined usage is less than a pre-determined value. Additionally or alternatively to one or more examples disclosed above, the method further comprises generating a data profile for the received data set, wherein the method further comprises performing a quality check of the received data set. Additionally or alternatively to one or more examples disclosed above, the method further comprises performing a quality check of the received data set. Additionally or alternatively to one or more examples disclosed above, the method further comprises processing the received data set to remove duplicated data contained within the data set. Additionally or alternatively to one or more examples disclosed above, the received data set includes data identified as being sensitive, and wherein the method further includes masking data within the data set that is identified as being sensitive. Additionally or alternatively to one or more examples disclosed above, the method further comprises tracking the lineage of the data set. Additionally or alternatively to one or more examples disclosed above, tracking the lineage of the data set includes inserting one or more hooks to the second computing resource, and recording one or more transactions performed on the data set by the second computing resource using the one or more hooks. Additionally or alternatively to one or more examples disclosed above, the method further comprises storing the recoded one or more transactions performed on the data set in a memory. Additionally or alternatively to one or more examples disclosed above, the first computing resource is a physical storage device that is maintained by a single user.

Other examples of the disclosure are directed to a non-transitory computer-readable storage medium storing one or more programs for generating and maintaining computing resources the one or more programs configured to be executed by one or more processors communicatively coupled to one or more processors of a system, the one or more programs including instructions to cause the system to, receiving a data set, receive one or more processing instructions corresponding to the received data set and comprising one or more processing tasks to be performed on the received data set, generate one or more data containers within a first computing resource based on the received one or more processing instructions, store the data set in the one or more containers within the first computing resource, generate a second computing resource on one or more cloud-based computing platforms based on the received one or more processing instructions, determine a usage of the second computing resource, and modify the second computing resource based on its determined usage. Additionally or alternatively to one or more examples disclosed above, generating the second computing resource on one or more cloud-based computing platforms based on the received one or more processing instructions includes selecting one or more blueprints from a set of pre-determined blueprints, wherein the selecting of the one or more blueprints is based on the received one or more processing instructions. Additionally or alternatively to one or more examples disclosed above, each blueprint of the set of pre-determined blueprints includes one or more parameters. Additionally or alternatively to one or more examples disclosed above, generating the second computing resource on the one or more cloud-based computing platforms includes presenting a user with the selected blueprints and receiving input from a user corresponding to a parameter of the one or more parameters. Additionally or alternatively to one or more examples disclosed above, generating the second computing resource on one or more cloud-based computing platforms based on the received one or more processing instructions includes selecting a cloud-based computing resource platform of the one or more cloud-based computing platforms based on the one or more parameters of the one or more selected blueprints. Additionally or alternatively to one or more examples disclosed above, generating the second computing resource on the one or more cloud-based computing platforms includes generating and transmitting one or more commands to the selected cloud-based computing resource platform to generate the one or more cloud-based computing resources. Additionally or alternatively to one or more examples disclosed above, modifying the second computing resource based on its determined usage includes upscaling the second computing resource if the determined usage is greater than a pre-determined value. Additionally or alternatively to one or more examples disclosed above, modifying the second computing resource based on its determined usage includes downscaling the second computing resource if the determined usage is less than a pre-determined value. Additionally or alternatively to one or more examples disclosed above, modifying the second computing resource based on its determined usage includes terminating the second computing resource if the determined usage is less than a pre-determined value. Additionally or alternatively to one or more examples disclosed above, the method further comprises generating a data profile for the received data set, wherein the data profile includes determining the identity of a client corresponding to the received data set. Additionally or alternatively to one or more examples disclosed above, the method further comprises generating a data profile for the received data set, wherein the method further comprises performing a quality check of the received data set. Additionally or alternatively to one or more examples disclosed above, the method further comprises processing the received data set to remove duplicated data contained within the data set. Additionally or alternatively to one or more examples disclosed above, the received data set includes data identified as being sensitive, and wherein the method further includes masking data within the data set that is identified as being sensitive. Additionally or alternatively to one or more examples disclosed above, the method further comprises tracking the lineage of the data set. Additionally or alternatively to one or more examples disclosed above, tracking the lineage of the data set includes inserting one or more hooks to the second computing resource, and recording one or more transactions performed on the data set by the second computing resource using the one or more hooks. Additionally or alternatively to one or more examples disclosed above, the first computing resource is a physical storage device that is maintained by a single user. Additionally or alternatively to one or more examples disclosed above, the method further comprises storing the recoded one or more transactions performed on the data set in a memory.

The foregoing description, for purpose of explanation, has made reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments, with various modifications, that are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed is:

1. A method for generating and maintaining computing resources comprising:
    receiving a data set;
    receiving one or more processing instructions corresponding to the received data set and comprising one or more processing tasks to be performed on the received data set;
    generating one or more data containers within a first computing resource based on the received one or more processing instructions, wherein the first computing resource is a persistent computing resource;
    storing the data set in the one or more containers within the first computing resource;

selecting, by one or more programs running in a computing hub, one or more cloud-based computing platforms based on a type of processing comprising a data operation that is to be performed on the data set and based on an efficiency of performing the type of processing at the one or more cloud-based computing platforms, wherein the type of processing is indicated by the one or more processing instructions, wherein the one or more cloud-based computing platforms are selected from a plurality of cloud-based computing platforms each comprising respective computing resources, and wherein the selecting comprises:
    analyzing, by the one or more programs, the one or more processing instructions to determine a type of processing indicated by the one or more processing instructions; and
    determining, by the one or more programs, that the determined type of processing is more efficiently handled using computing resources of the one or more cloud-based computing platforms as compared to using the computing resources of one or more other cloud-based computing platforms in the plurality of cloud-based computing platforms;
generating a second computing resource on the selected one or more cloud-based computing platforms based on the received one or more processing instructions, wherein the second computing resource is an ephemeral node and is executed externally to the first computing resource;
accessing the stored data set of the first computing resource for processing by the second computing resource;
determining a processing usage of the second computing resource; and
modifying the second computing resource based on its determined processing usage.

2. The method of claim 1, wherein generating the second computing resource on one or more cloud-based computing platforms based on the received one or more processing instructions includes selecting one or more blueprints from a set of pre-determined blueprints, wherein the selecting of the one or more blueprints is based on the received one or more processing instructions.

3. The method of claim 2, wherein each blueprint of the set of pre-determined blueprints includes one or more parameters, and wherein generating the second computing resource on the one or more cloud-based computing platforms includes presenting a user with the selected blueprints and receiving input from a user corresponding to a parameter of the one or more parameters.

4. The method of claim 3, wherein generating the second computing resource on one or more cloud-based computing platforms based on the received one or more processing instructions includes selecting a cloud-based computing resource platform of the one or more cloud-based computing platforms based on the one or more parameters of the one or more selected blueprints.

5. The method of claim 1, wherein the method further comprises generating a data profile for the received data set, wherein the data profile includes determining the identity of a client corresponding to the received data set.

6. The method of claim 5, wherein the method further comprises performing a quality check of the received data set.

7. The method of claim 1, wherein the first computing resource is a physical storage device that is maintained by a single user.

8. The method of claim 1, further comprising:
recording lineage information from the one or more processing instructions based on the type of processing performed at the selected one or more cloud-based computing platforms; and
storing the lineage information in the first computing resource.

9. A system for generating and maintaining computing resources comprising:
one or more processors;
a memory; and
a first computing resource;
wherein the one or more processors are configured to execute instructions stored on the memory that cause the system to:
    receive a data set;
    receive one or more processing instructions corresponding to the received data set and comprising one or more processing tasks to be performed on the received data set;
    generate one or more data containers within a first computing resource based on the received one or more processing instructions, wherein the first computing resource is a persistent computing resource;
    store the data set in the one or more containers within the first computing resource;
    select, by one or more programs running in a computing hub, one or more cloud-based computing platforms based on a type of processing comprising a data operation that is to be performed on the data set and based on an efficiency of performing the type of processing at the one or more cloud-based computing platforms, wherein the type of processing is indicated by the one or more processing instructions, wherein the one or more cloud-based computing platforms are selected from a plurality of cloud-based computing platforms each comprising respective computing resources, and wherein the selecting comprises:
        analyzing, by the one or more programs, the one or more processing instructions to determine a type of processing indicated by the one or more processing instructions; and
        determining, by the one or more programs, that the determined type of processing is more efficiently handled using computing resources of the one or more cloud-based computing platforms as compared to using the computing resources of one or more other cloud-based computing platforms in the plurality of cloud-based computing platforms;
    generate a second computing resource on the selected one or more cloud-based computing platforms based on the received one or more processing instructions, wherein the second computing resource is an ephemeral node and is executed externally to the first computing resource;
    access the stored data set of the first computing resource for processing by the second computing resource;
    determine a processing usage of the second computing resource; and
    modify the second computing resource based on its determined processing usage.

10. The system of claim 9, wherein generating the second computing resource on one or more cloud-based computing platforms based on the received one or more processing instructions includes selecting one or more blueprints from a set of pre-determined blueprints, wherein the selecting of the one or more blueprints is based on the received one or more processing instructions.

11. The system of claim 10, wherein each blueprint of the set of pre-determined blueprints includes one or more parameters, and wherein generating the second computing resource on the one or more cloud-based computing platforms includes presenting a user with the selected blueprints and receiving input from a user corresponding to a parameter of the one or more parameters.

12. The system of claim 11, wherein generating the second computing resource on the one or more cloud-based computing platforms includes generating and transmitting one or more commands to the selected cloud-based computing resource platform to generate the one or more cloud-based computing resources.

13. The system of claim 9, wherein the method further comprises generating a data profile for the received data set, and wherein the method further comprises performing a quality check of the received data set.

14. The system of claim 9, wherein the first computing resource is a physical storage device that is maintained by a single user.

15. The system of claim 9, wherein the system is further caused to:
   record lineage information from the one or more processing instructions based on the type of processing performed at the selected one or more cloud-based computing platforms; and
   store the lineage information in the first computing resource.

16. A non-transitory computer-readable storage medium storing one or more programs for generating and maintaining computing resources the one or more programs configured to be executed by one or more processors communicatively coupled to one or more processors of a system, the one or more programs including instructions to cause the system to:
   receive a data set;
   receive one or more processing instructions corresponding to the received data set and comprising one or more processing tasks to be performed on the received data set;
   generate one or more data containers within a first computing resource based on the received one or more processing instructions, wherein the first computing resource is a persistent computing resource;
   store the data set in the one or more containers within the first computing resource;
   select, by one or more programs running in a computing hub, one or more cloud-based computing platforms based on a type of processing comprising a data operation that is to be performed on the data set and based on an efficiency of performing the type of processing at the one or more cloud-based computing platforms, wherein the type of processing is indicated by the one or more processing instructions, wherein the one or more cloud-based computing platforms are selected from a plurality of cloud-based computing platforms each comprising respective computing resources, and wherein the selecting comprises:
      analyzing, by the one or more programs, the one or more processing instructions to determine a type of processing indicated by the one or more processing instructions; and
      determining, by the one or more programs, that the determined type of processing is more efficiently handled using computing resources of the one or more cloud-based computing platforms as compared to using the computing resources of one or more other cloud-based computing platforms in the plurality of cloud-based computing platforms;
   generate a second computing resource on the selected one or more cloud-based computing platforms based on the received one or more processing instructions, wherein the second computing resource is an ephemeral node and is executed externally to the first computing resource;
   access the stored data set of the first computing resource for processing by the second computing resource;
   determine a processing usage of the second computing resource; and
   modify the second computing resource based on its determined processing usage.

17. The non-transitory computer-readable storage medium of claim 16, wherein generating the second computing resource on one or more cloud-based computing platforms based on the received one or more processing instructions includes selecting one or more blueprints from a set of pre-determined blueprints, wherein the selecting of the one or more blueprints is based on the received one or more processing instructions.

18. The non-transitory computer-readable storage medium of claim 17, wherein each blueprint of the set of pre-determined blueprints includes one or more parameters, wherein generating the second computing resource on the one or more cloud-based computing platforms includes presenting a user with the selected blueprints and receiving input from a user corresponding to a parameter of the one or more parameters.

19. The non-transitory computer-readable storage medium of claim 18, wherein generating the second computing resource on the one or more cloud-based computing platforms includes generating and transmitting one or more commands to the selected cloud-based computing resource platform to generate the one or more cloud-based computing resources.

20. The non-transitory computer-readable storage medium of claim 16, wherein the system is further caused to generate a data profile for the received data set, wherein the data profile includes determining the identity of a client corresponding to the received data set.

21. The non-transitory computer-readable storage medium of claim 16, wherein the system is further caused to generate a data profile for the received data set, wherein the method further comprises performing a quality check of the received data set.

22. The non-transitory computer-readable storage medium of claim 16, wherein the first computing resource is a physical storage device that is maintained by a single user.

23. The non-transitory computer-readable storage medium of claim 16,
   wherein the system is further caused to:
   record lineage information from the one or more processing instructions based on the type of processing performed at the selected one or more cloud-based computing platforms; and
   store the lineage information in the first computing resource.

* * * * *